United States Patent
Dow et al.

(10) Patent No.: US 10,396,587 B2
(45) Date of Patent: *Aug. 27, 2019

(54) TETHERLESS DEVICE CHARGING FOR CHAINED DEVICES

(71) Applicant: INTERNATIONAL BUSINESS MACHINES CORPORATION, Armonk, NY (US)

(72) Inventors: Eli M. Dow, Poughkeepsie, NY (US); Thomas D. Fitzsimmons, Poughkeepsie, NY (US); James P. Gilchrist, Poughkeepsie, NY (US); Galina Gorelik, Hyde Park, NY (US); Frank R. LeFevre, Jr., Poughkeepsie, NY (US); Steven K. Schmidt, Essex Junction, VT (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,429

(22) Filed: Nov. 29, 2017

(65) Prior Publication Data

US 2018/0083476 A1 Mar. 22, 2018

Related U.S. Application Data (63) Continuation of application No. 14/847,024, filed on Sep. 8, 2015, now Pat. No. 9,882,414, which is a
(Continued)

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/027* (2013.01); *H02J 50/10* (2016.02); *H02J 50/12* (2016.02); *H02J 50/40* (2016.02)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 7,671,561 B2 * 3/2010 Ludtke .................. H02J 7/0027
320/106

OTHER PUBLICATIONS

Eli M. Dow, et al., "Tetherless Device Charging for Chained Devices", U.S. Appl. No. 14/753,278, filed Jun. 29, 2015.
(Continued)

*Primary Examiner* — Arun C Williams
(74) *Attorney, Agent, or Firm* — Cantor Colburn LLP; Teddi Maranzano (57) ABSTRACT

In one embodiment, a method includes integrating a charging pad into a powered device having a power supply, where the powered device is at least one of a monitor and a keyboard. The method includes configuring the charging pad to receive a first chargeable device in a charging position relative to the charging pad. The method further includes configuring the charging pad to deliver an electrical charge from the power supply to the first chargeable device when the chargeable device is in the charging position.

18 Claims, 6 Drawing Sheets

Related U.S. Application Data continuation of application No. 14/753,278, filed on Jun. 29, 2015, now Pat. No. 9,935,484.

(51) Int. Cl.
*H02J 50/10* (2016.01)
*H02J 50/40* (2016.01)
*H02J 50/12* (2016.01)

(58) Field of Classification Search
USPC .......................................................... 320/108
See application file for complete search history.

(56) References Cited

OTHER PUBLICATIONS

Eli M. Dow, et al., "Tetherless Device Charging for Chained Devices", U.S. Appl. No. 14/847,02478, filed Sep. 8, 2015.
List of IBM Patents or Patent Applications Treated as Related; (Appendix P), Filed Nov. 29, 2017; 2 pages.

\* cited by examiner

TETHERLESS DEVICE CHARGING FOR CHAINED DEVICES

DOMESTIC PRIORITY

This application is a continuation of U.S. patent application Ser. No. 14/847,024, filed Sep. 8, 2015, entitled "TETHERLESS DEVICE CHARGING FOR CHAINED DEVICES," which in turn claims priority from U.S. patent application Ser. No. 14/753,278, filed on Jun. 29, 2015. The entire contents of all of the applications listed above are incorporated herein by reference.

BACKGROUND

Various embodiments of this disclosure relate to device charging and, more particularly, to tetherless device charging for chained devices.

Many users of consumer electronics have multiple devices, which may include laptop computers, mobile phones, tablets, and others. In some cases, tethers are needed to connect devices for the purpose of charging or communicating data. For instance, a universal serial bus (USB) cable may be used to charge a mobile device by way of a laptop's internal battery, and to transfer data between the two devices. Thus, many devices and their various charging cables may take up room in a user's physical workspace.

SUMMARY

In one embodiment of this disclosure, a method includes integrating a charging pad into a powered device having a power supply, where the powered device is at least one of a monitor and a keyboard. The method includes configuring the charging pad to receive a first chargeable device in a charging position relative to the charging pad. The method further includes configuring the charging pad to deliver an electrical charge from the power supply to the first chargeable device when the chargeable device is in the charging position.

In another embodiment, a system includes a powered device having a power supply and a charging pad. The charging pad is configured to receive a first chargeable device in a charging position relative to the charging pad, and to deliver an electrical charge from the power supply to the first chargeable device when the chargeable device is in the charging position. The powered device is at least one of a monitor and a keyboard.

In yet another embodiment, a computer program product for charging one or more chained devices includes a computer readable storage medium having program instructions embodied therewith. The program instructions are executable by a processor to cause the processor to perform a method. The method includes detecting presence of a chargeable device at a charging pad integrated into a powered device having a powered supply. The powered device is at least one of a monitor and a keyboard. The method further includes delivering an electrical charge from the power supply to the first chargeable device by way of the charging pad, responsive to the detecting.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are configured to charge one or more chargeable devices by chaining them to a powered device, such as a monitor, thereby allowing the powered device's power supply to be used as a source of power for charging the chargeable devices.

Figure 1A:
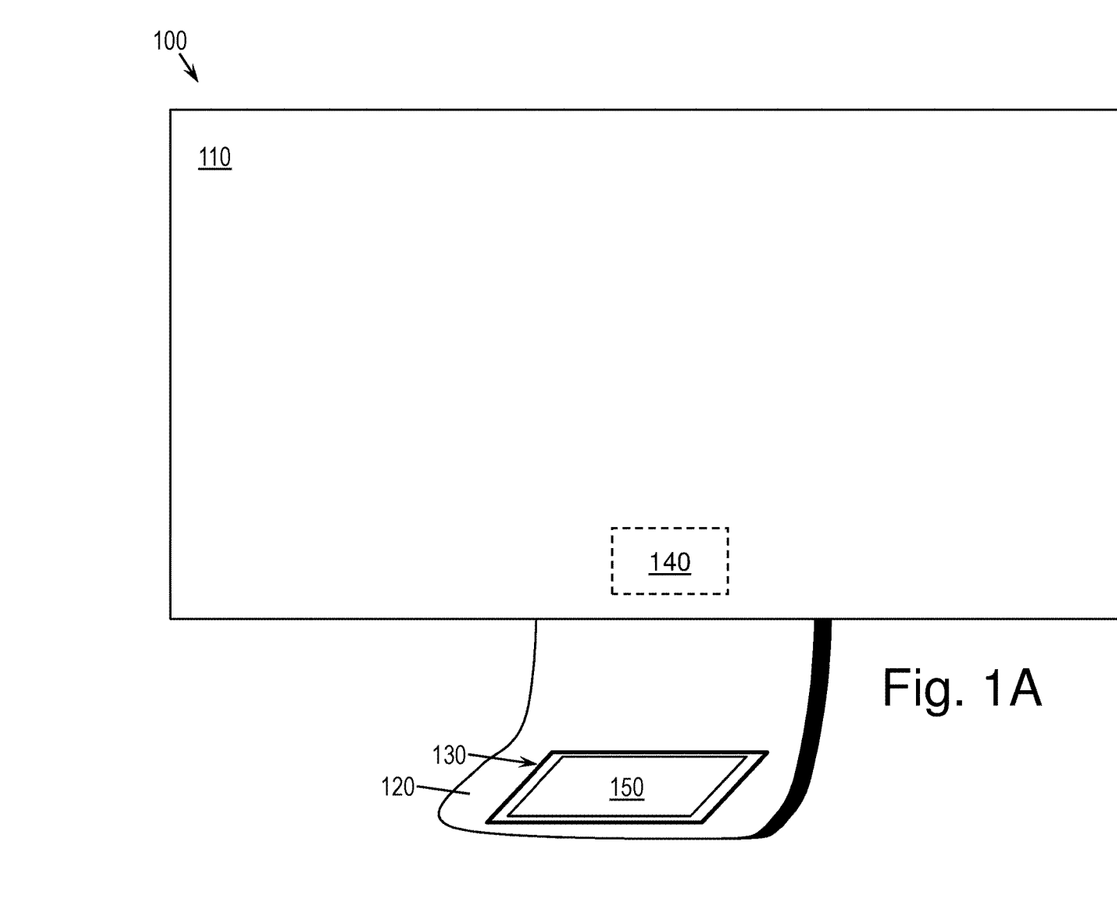
FIGS. 1A-1B are diagrams of a charging system, according to some embodiments of this disclosure.
Figure 1B:
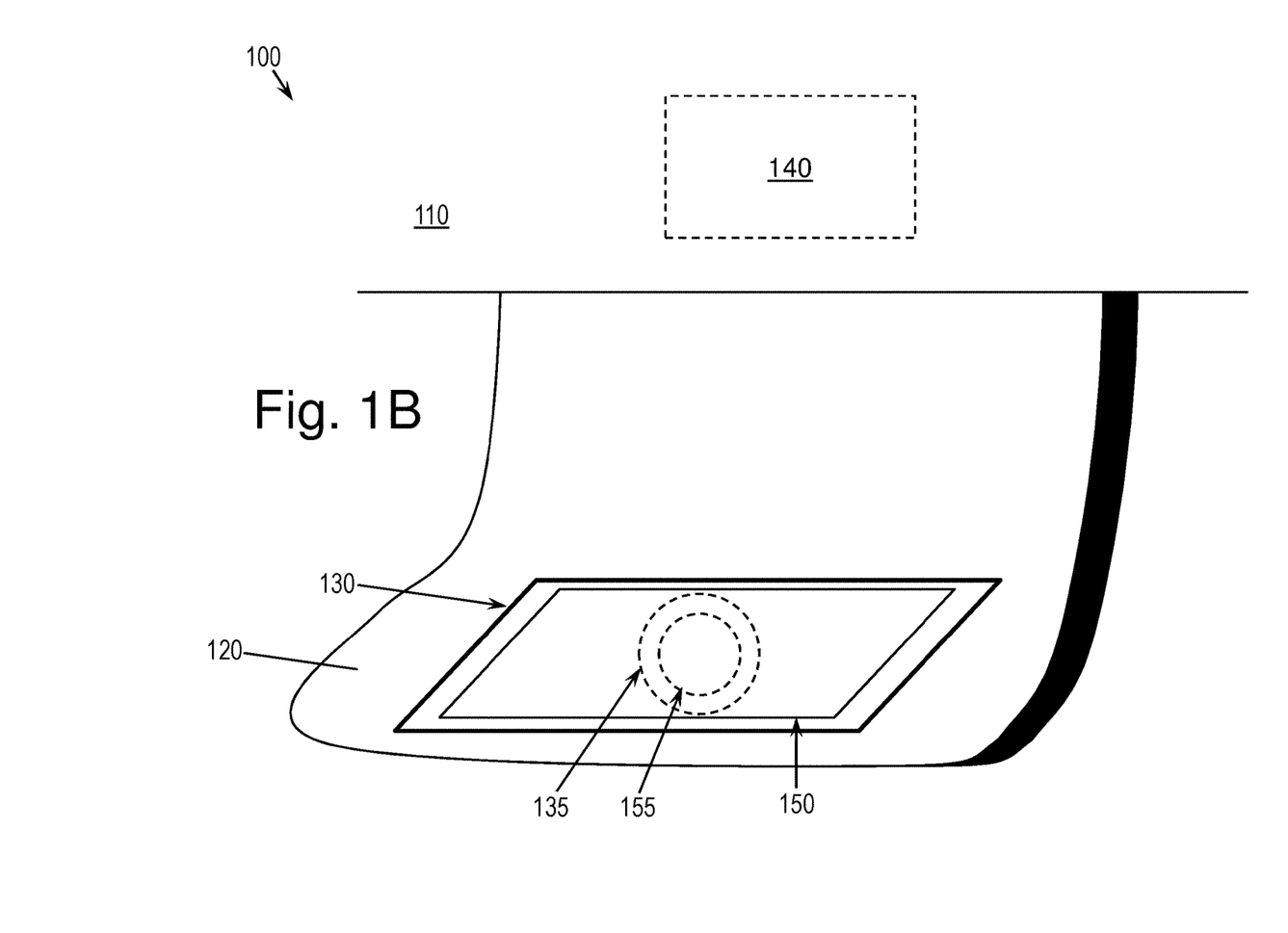

FIGS. 1A and 1B are diagrams of a charging system 100, according to some embodiments of this disclosure. As shown in FIG. 1A, the charging system 100 may apply to a powered device 110 and a chargeable device 150. For example, the powered device 110 may be a monitor, a wired keyboard, or a computer. The powered device 110 may have a power supply 140, which is illustrated in FIGS. 1A-1B as a dashed box because it is not visible in this example, given the depicted perspective of the powered device 110. In some embodiments, this power supply 140 may include an alternating current (AC) or direct current (DC) adapter pluggable into a power outlet. However, it will be understood that an internal battery may also suffice as the power supply 140. For example, the chargeable device 150 may be a mobile phone, a tablet computer, a wireless trackpad, a wireless keyboard, or a wireless mouse. The chargeable device 150 may include a rechargeable internal battery. In some embodiments, the charging system 100 may enable the chargeable device 150 to draw power from the powered device 110, without use of a tether to plug the chargeable device 150 into the powered device 110 or into a separate power supply.

Figure 2:
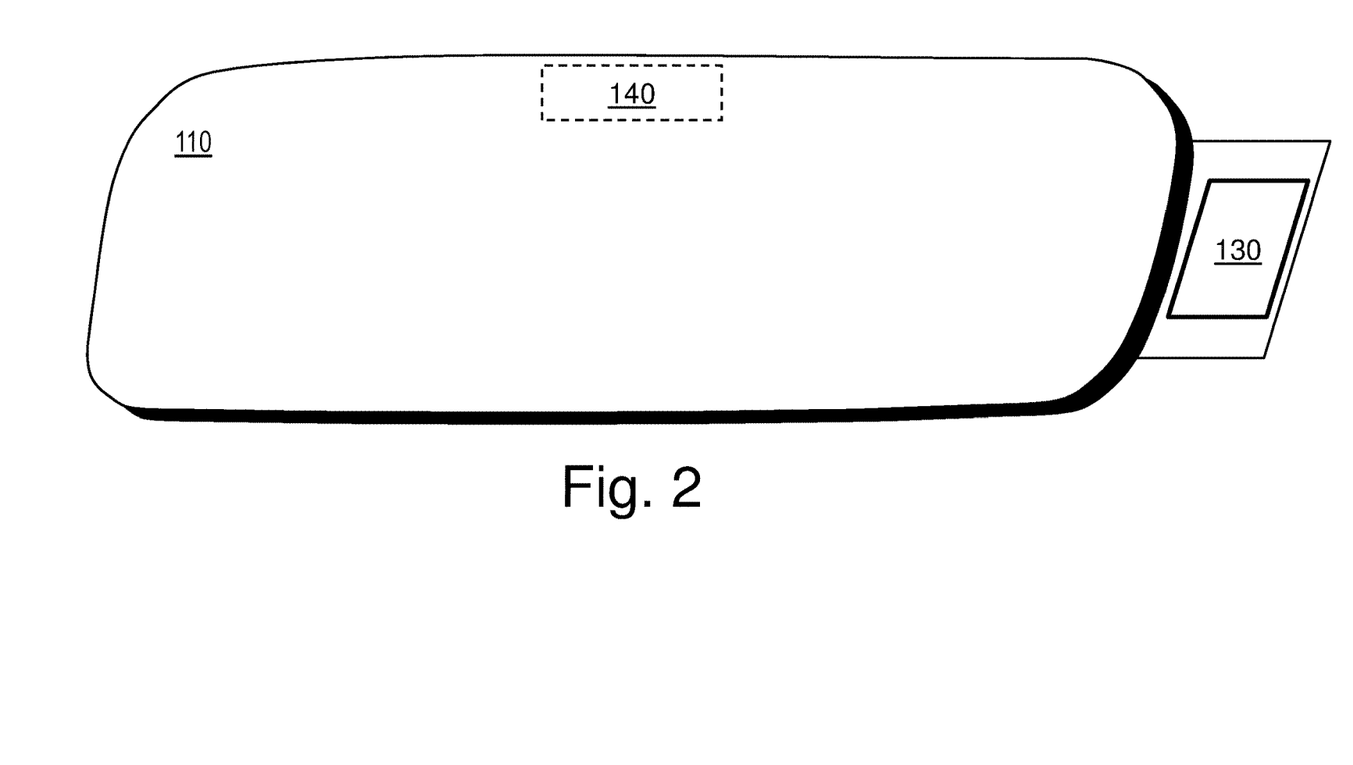
FIG. 2 is another diagram of the charging system, according to some embodiments of this disclosure.

The powered device 110 may include an abutment 120. For example, if the powered device 110 is a monitor, as shown in FIG. 1A, the abutment 120 may be a portion of the monitor acting as part of a stand. FIG. 2 is another diagram of the charging system 100, according to some embodiments, in which the powered device 110 is a keyboard. In this case, the abutment 120 may be a portion of the keyboard that extends, for example, beyond the keys, below the rightmost keys, or at the rightmost edge of the keyboard. In FIG. 2, only a single abutment 120 is shown, on the right side of the powered device 110. In some embodiments, however, the powered device 110 may include an abutment 120 on each side, thus becoming equally convenient for left-handed and right-handed people.

Returning to FIG. 1A, the abutment 120 may include a charging pad 130, which may receive an electrical charge from the power supply 140 of the powered device 110. In some embodiments, both the abutment 120 and the charging pad 130 may be integrated into the powered device 110, so that the charging pad 130 can receive power from the power supply 140 of the powered device 110. As shown, if the abutment 120 is part of a monitor stand, the charging pad 130 may be positioned on top of an upwardly facing portion of the monitor stand or at a front edge of the monitor stand, for example. The charging pad 130 may be configured to pass an electrical charge from the powered device 110 to the chargeable device 150 when the chargeable device 150 is positioned on the charging pad 130.

FIG. 1B is a closer view of the abutment 120 of the powered device 110 and surrounding components. As shown, to enabling the charging pad 130 to pass an electrical charge to the chargeable device 150, the charging pad 130 may include pad hardware 135, and the chargeable device 150 may include receiving hardware 155. The pad hardware 135 of the charging pad 130 and the receiving hardware 155 of the chargeable device 150 may be configured to couple together, thus also coupling together the charging pad 130 and the chargeable device 150, so as to enable passing of the electrical charge. This coupling may take the form of inductive coupling, for example, to enable inductive charging. In this case, the chargeable device 150, by way of its receiving hardware 155, and the charging pad 130, by way of its pad hardware 135, may have good inductive resonance with inductive coils tuned to resonate at the same frequency. It will be understood, however, that other forms of coupling and charging may also be used, such as charging by way of magnetic resonance (also referred to as magnetic induction or electromagnetic induction). One of skill in the art will understand how to provide the charging pad 130 and the chargeable device 150 with, respectively, pad hardware 135 and receiving hardware 155 to enable appropriate coupling for charging the chargeable device 150.

In some embodiments, the chargeable device 150 may need to be in a proper charging position to enable reliable charging. This charging position may be any required alignment and proximity with the charging pad 130 to enable passing of the electrical charge. For example, and not by way of limitation, the charging position may be a position in which the chargeable device 150 touches the charging pad 130 such that the receiving hardware 155 and the pad hardware 135 are physically aligned. Some embodiments of the charging system 100 may include a mechanism for maintaining the placement of the chargeable device 150 on the charging pad 130, so as to ensure the charging position is maintained once achieved. For example, the abutment 120 may include a cradle into which the chargeable device 150 can be inserted, with the charging pad 130 being positioned at the bottom or at an inside edge of the cradle. For another example, if the chargeable device 150 is capable of vibrating for notification or other purposes, such vibration may be provided by means of one or more linear actuator motors rather than conventional drive shaft motors. Using linear actuator motors in the chargeable device 150 may enable the chargeable device 150 to achieve more directed movement than can be achieved with drive shaft motors. Thus, the chargeable device 150 may correct its positioning to more closely align with the pad hardware 130 of the charging pad 130.

In some embodiments, the charging pad 130 may constantly receive an electrical charge when the powered device 110 has power, or in some embodiments, the charging pad 130 may activate (i.e., become powered on) only upon detection that the chargeable device 150 is in charging position. In the latter case, the charging pad 130 may detect the presence of the chargeable device 130, and the powered device 110 may then provide an electrical charge to the charging pad 130 responsive to that detection. For example, and not by way of limitation, this detection may be performed through the use of a magnetic switch. When activated, the magnetic switch may likewise activate the pad hardware 135 (e.g., by initiating the induction coil transmission circuit, in the case of inductive charging) for charging the chargeable device 150. In that case, the chargeable device 150 may include at least one magnet with enough field to activate a responsive magnetic switch on the pad hardware 135 to open a relay or, in the case of inductive charging, complete a charging coil circuit to activate the pad hardware 135 and thus activate the charging pad 130 itself. A further benefit of the magnetic switch is that such a switch may also aid in alignment of the chargeable device 150, especially if multiple magnets are used.

Upon removal of the chargeable device 150, when the charging pad 130 no longer detects the presence of the chargeable device 150, the powered device 110 may cease delivering the electrical charge to the charging pad 130, and the charging pad 130 may thus cease providing an electrical charge.

Figure 3:
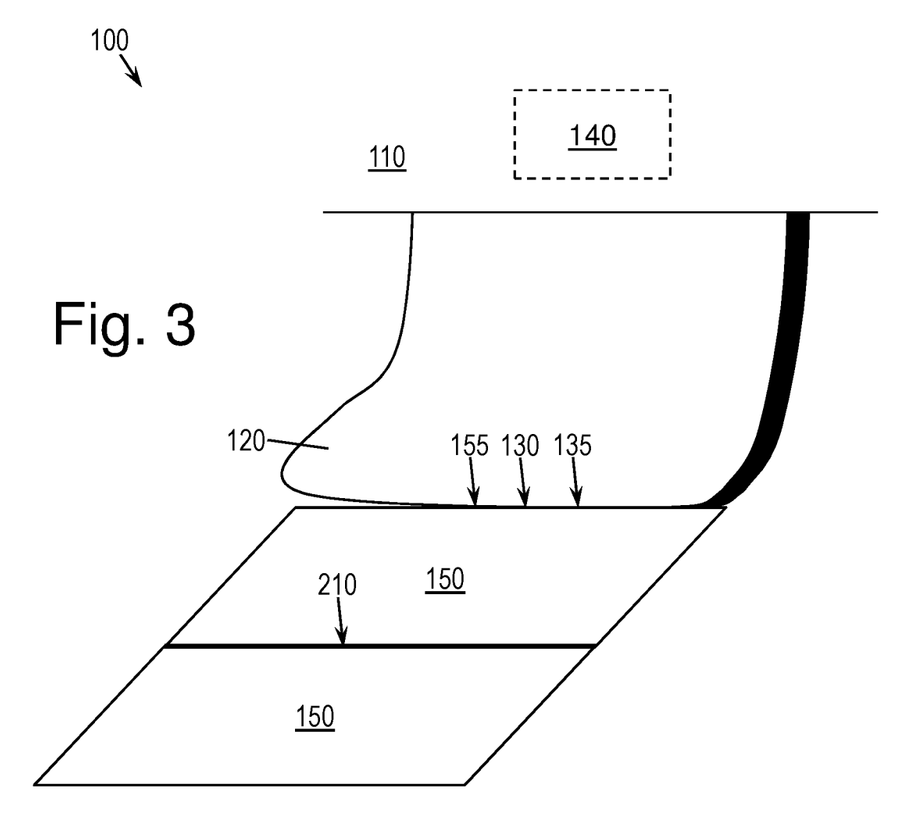
FIG. 3 is yet another diagram of the charging system, according to some embodiments of this yet disclosure.

FIG. 3 is yet another diagram of the charging system 100, according to some embodiments of this disclosure. While FIGS. 1A-2 illustrate a single chargeable device 150 being chained to the powered device 110 for charging, FIG. 3 illustrates that some embodiments may enable two or more chargeable devices 150 to be chained to one another and to the powered device 110 for charging.

As shown, the charging pad 130 may be positioned on an edge of the abutment 120, which may make it more accessible for chaining more than a single chargeable device 150, with each chargeable device 150 in the chain being coupled to one or more adjacent chargeable devices 150. In this case, the receiving hardware 155 may be positioned at one or more edges of the device chargeable device 150, thus enabling the chargeable device 150 to lie flat on the table or other work surface when in charging position, and further enabling charging hardware 210 to remain exposed for use by another chargeable device.

In some embodiments, each chargeable device may have charging hardware 210 in addition to its receiving hardware 155. Further, in some embodiments, the charging hardware 210 may, but need not, be positioned at an opposite edge from the receiving hardware 155. The receiving hardware 155 of a first chargeable device 150 may receive an electrical charge, and the charging hardware 210 on the first chargeable device 150 may transmit an electrical charge to a second chargeable device 150 chained to the first chargeable device 150. Thus, the first chargeable device 150 may be coupled with the second chargeable device 150 by way of a coupling between the charging hardware 210 of the first chargeable device 150 and the receiving hardware 155 of the second chargeable device 150. The first chargeable device 150 may receive an electrical charge for charging itself, such as through the charging pad 130 of the powered device 110, and may pass along an electrical charge for charging the second chargeable device 150.

When the first chargeable device 150 is in charging position, the second chargeable device 150 may be placed in a charging position for receiving an electrical charge from the first chargeable device 150. This latter charging position may align the first device's charging hardware 210 with the second chargeable device's receiving hardware 155. In this case, the powered device 110, the first chargeable device 150, and the second chargeable device 150 may be chained together, such that the power supply 140 of the powered device 110 may indirectly supply an electrical charge to each of the first chargeable device 150 and the second chargeable device 150. It will be understood that additional chargeable devices 150 may be added to this chain in applicable charging positions, thus enabling the power supply 140 of the powered device 110 to indirectly supply an electrical charge for charging each of the chained chargeable devices 150. Thus, one or more chargeable devices 150 may be chained to the powered device 110 to enable charging to the one or more chargeable devices 150 through the power supply 140 of the powered device 110.

In some embodiments, a first chargeable device may be configured to detect when a second chargeable device 150 is in charging position for charging from the first chargeable device 150. In this case, upon detecting the presence of the second chargeable device 150 in chargeable position with respect to the first chargeable device 150, and thus with respect to the charging hardware 210 of the first chargeable device 150, the first chargeable device 150 may pass an electrical charge through its charging hardware 210 to the receiving hardware 155 of the second chargeable device 150. Thus, each chargeable device 150 need not expend power by passing an electrical charge to its charging hardware 210 unless another chargeable device 150 is in a charging position to receive that electrical charge.

Figure 4:
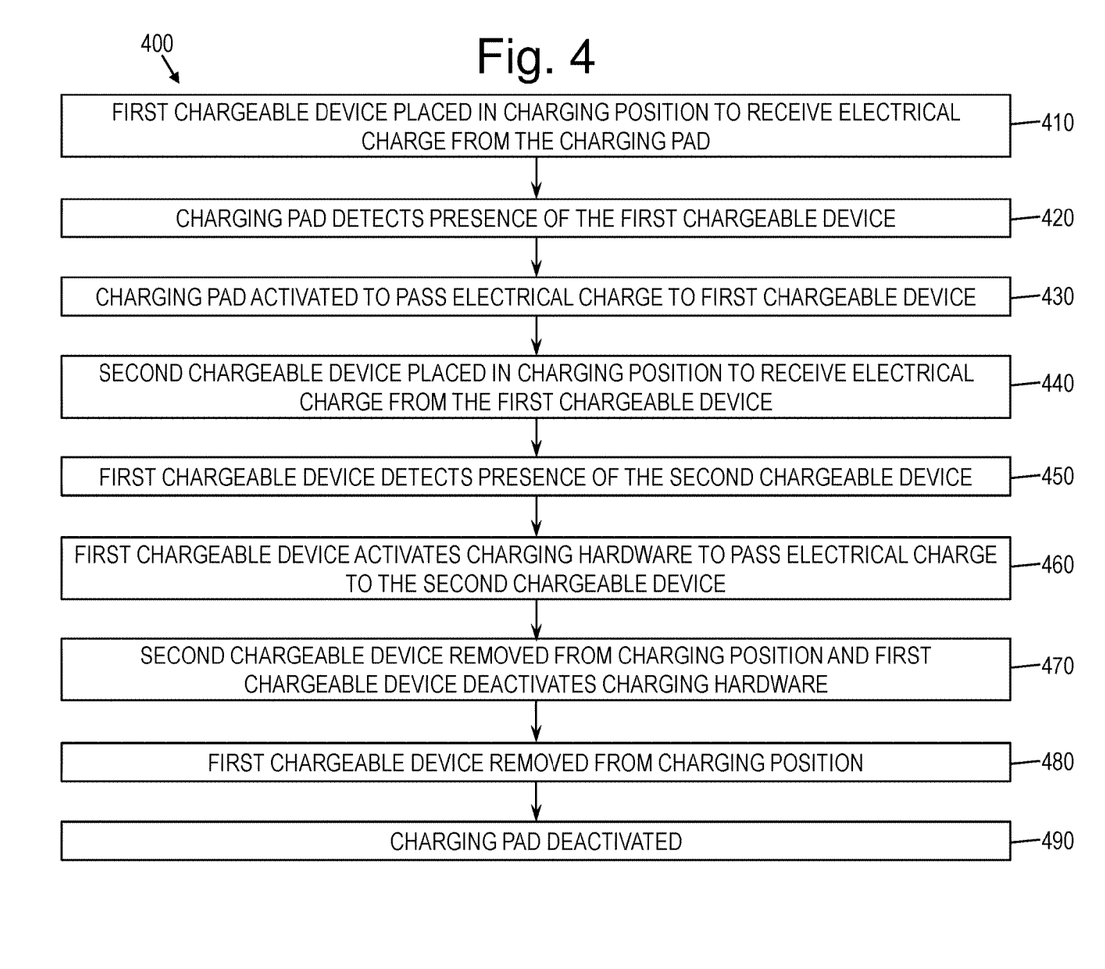
FIG. 4 is a flow diagram of a method for charging chained devices, according to some embodiments of this disclosure.

FIG. 4 is a flow diagram of a method 400 for charging chained chargeable devices 150, according to some embodiments of this disclosure. As shown, at block 410, a first chargeable device 150 may be placed in charging position for receiving an electrical charge from a charging pad 130, where the charging pad 130 is integrated into a powered device 110 having a power supply 140. At block 420, the charging pad 130 may detect the presence of the first chargeable device 150 in the charging position. At block 430, the charging pad 130 may activate, responsive to this detection, and may pass an electrical charge to the first chargeable device 150. More specifically, for example, the pad hardware 135 of the charging pad 130 may pass the electrical charge to the receiving hardware 155 of the first chargeable device 150. In some embodiments, at block 440, a second chargeable device 150 may be placed in charging position for receiving an electrical charge from the first chargeable device 150. More specifically, the receiving hardware 155 of the second chargeable device 150 may be positioned to receive an electrical charge from the charging hardware 210 of the first chargeable device 150. At block 450, the first chargeable device 150 may detect the presence of the second chargeable device 150 in the charging position. At block 460, the chargeable device 150 may activate its charging hardware 210, responsive to this detection, and may pass an electrical charge to the second chargeable device 150. More specifically, for example, the charging hardware 210 of the first chargeable device 150 may pass the electrical charge to the receiving hardware 155 of the second chargeable device 150.

At block 470, the second chargeable device 150 may be removed from its charging position and, in response, the first chargeable device 150 may deactivate its charging hardware 210. At block 480, the first chargeable device 150 be removed from its charging position. At block 490, the charging pad 130 may deactivate its pad hardware 130, response to the first chargeable device 150 having been removed.

It will be understood, however, that in some embodiments, the charging pad 130 may remain in an always-on state, in which the powered device 110 constantly delivers an electrical charge to the charging pad 130 so long as the powered device 110 is on or plugged in. In this case, no detection operations need be performed by the charging pad 130 or the powered device 110.

It will be further understood that if the first chargeable device 150 moves from its charging position relative to the charging pad 130, with the second chargeable device 150 remaining in its charging position with respect to the charging hardware 210 of the first chargeable device 150, the second chargeable device 150 may then no longer be receiving an electrical charge indirectly from the powered device 110. In some embodiments, the second chargeable device 150 may continue receiving an electrical charge from the first chargeable device 150, although the first chargeable device 150 itself may no longer be charging. In some embodiments, however, the first chargeable device 150 may automatically deactivate its charging hardware 210, and may thus cease sending an electrical charge to the second chargeable device 150, upon detecting the first chargeable device is no longer charging.

It will further be understood that the powered device 110 need not be involved in the chain of chargeable devices 150 at all, and that one or more chargeable devices 150 may be chained together to pass along electrical charges, without the use of an external power supply 140. In this case, a first chargeable device 150 that is not receiving a charge from another chargeable device 150 in the chain may provide (e.g., by way of its internal battery) an indirect source for charging the remaining chargeable devices 150 in the chain.

Figure 5:
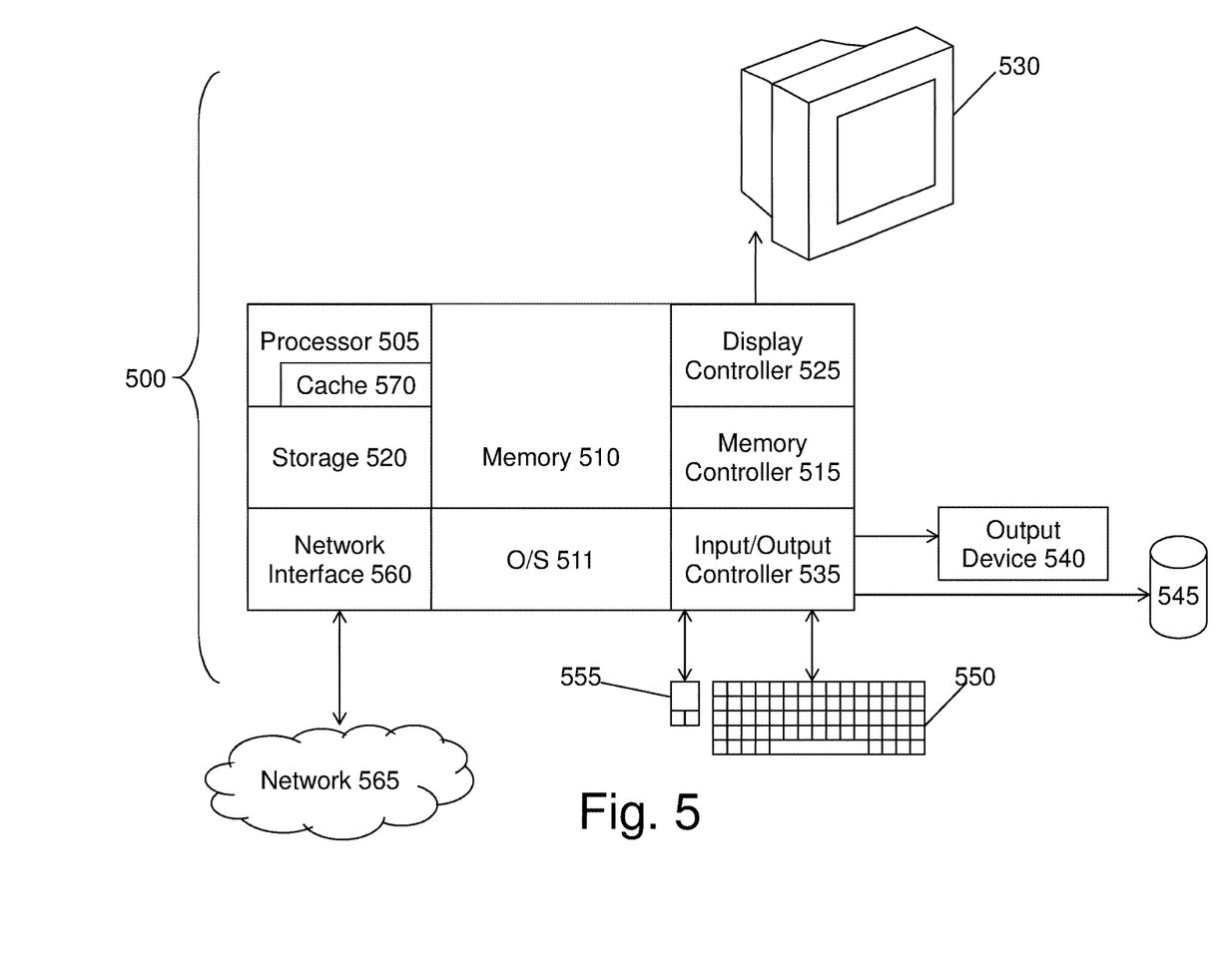
FIG. 5 is a block diagram of a computer system for implementing some or all aspects of the charging system, according to some embodiments of this disclosure.

FIG. 5 illustrates a block diagram of a computer system 500 for use in implementing a charging system or method according to some embodiments. The charging systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For instance, each of the chargeable devices 150 and the powered device 110 may be a computer system 500, such as the one illustrated in FIG. 5.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the charging systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Charging systems and methods according to this disclosure may be embodied, in whole or in part, in computer program products or in computer systems 500, such as that illustrated in FIG. 5.

Technical effects and benefits of some embodiments include the ability charge one or more devices in a chain of chargeable devices 150, without the need for tethers to the chargeable devices 150. As a result, the number of cables needed within a workspace may be reduced, and area in workspace may be left available for other use.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, at a first chargeable device, a second chargeable device in a second charging position relative to the first charging device;
   wherein the first chargeable device comprises first receiving hardware configured to couple to a powered device when in a first charging position relative to the powered device;
   wherein the first receiving hardware is further configured to receive an electrical charge from a power supply of the powered device when the first chargeable device is in the first charging position;
   wherein the first chargeable device further comprises first charging hardware configured to receive second receiving hardware of the second chargeable device in the second charging position relative to the first chargeable device;
   delivering, by way of the first charging hardware of the first chargeable device, an electrical charge from the powered device to the second chargeable device, responsive to the receiving, when the first chargeable device is in the first charging position and the second chargeable device is in the second charging position.

2. The method of claim 1, wherein the first chargeable device is a wireless trackpad.

3. The method of claim 1, wherein the power supply of the powered device is configured to charge both the first chargeable device and the second chargeable device when the first chargeable device is in the first charging position and the second chargeable device is in the second charging position.

4. The method of claim 1, the powered device configured to supply power to each of one or more chargeable devices chained to the powered device by way of a charging pad integrated with the powered device.

5. The method of claim 4, the charging pad further configured to detect presence of the first chargeable device in the first charging position, and to deliver the electrical charge to the first chargeable device responsive to the detection.

6. The method of claim 4, the charging pad being configured to couple with the first chargeable device using at least one of inductive coupling and magnetic resonance.

7. A system comprising:
   a first chargeable device comprising:
      first receiving hardware configured to couple to a powered device when in a first charging position relative to the powered device;
      wherein the first receiving hardware is further configured to receive an electrical charge from a power supply of the powered device when the first chargeable device is in the first charging position;
      first charging hardware configured to receive second receiving hardware of a second chargeable device in a second charging position relative to the first chargeable device;
      wherein the first charging hardware is configured to deliver an electrical charge from the powered device to the second chargeable device when the first chargeable device is in the first charging position and the second chargeable device is in the second charging position.

8. The system of claim 7, wherein the first chargeable device is a wireless trackpad.

9. The system of claim 7, wherein the power supply of the powered device is configured to charge both the first chargeable device and the second chargeable device when the first chargeable device is in the first charging position and the second chargeable device is in the second charging position.

10. The system of claim 7, the powered device configured to supply power to each of one or more chargeable devices chained to the powered device by way of a charging pad integrated with the powered device.

11. The system of claim 10, the charging pad further configured to detect presence of the first chargeable device in the charging position, and to deliver the electrical charge to the first chargeable device responsive to the detection.

12. The system of claim 10, the charging pad being configured to couple with the first chargeable device using at least one of inductive coupling and magnetic resonance.

13. A computer program product for charging one or more chained devices, the computer program product comprising a non-transitory computer readable storage medium having program instructions embodied therewith, the program instructions executable by a processor to cause the processor to perform a method comprising:
   receiving, at a first chargeable device, a second chargeable device in a second charging position relative to the first charging device;
   wherein the first chargeable device comprises first receiving hardware configured to couple to a powered device when in a first charging position relative to the powered device;
   wherein the first receiving hardware is further configured to receive an electrical charge from a power supply of the powered device when the first chargeable device is in the first charging position;
   wherein the first chargeable device further comprises first charging hardware configured to receive second receiving hardware of the second chargeable device in the second charging position relative to the first chargeable device;
   delivering, by way of the first charging hardware of the first chargeable device, an electrical charge from the powered device to the second chargeable device, responsive to the receiving, when the first chargeable device is in the first charging position and the second chargeable device is in the second charging position.

14. The computer program product of claim 13, wherein the first chargeable device is a wireless trackpad.

15. The computer program product of claim 13, wherein the power supply of the powered device is configured to charge both the first chargeable device and the second chargeable device when the first chargeable device is in the first charging position and the second chargeable device is in the second charging position.

16. The computer program product of claim 13, the powered device configured to supply power to each of one or more chargeable devices chained to the powered device by way of a charging pad integrated with the powered device.

17. The computer program product of claim 16, the charging pad further configured to detect presence of the first chargeable device in the first charging position, and to deliver the electrical charge to the first chargeable device responsive to the detection.

18. The computer program product of claim 16, the charging pad being configured to couple with the first chargeable device using at least one of inductive coupling and magnetic resonance.

* * * * *